United States Patent
Yamamoto et al.

(12)
(10) Patent No.: US 6,222,972 B1
(45) Date of Patent: Apr. 24, 2001

(54) WIDEBAND PLASTIC-CLAD OPTICAL FIBER

(75) Inventors: Tetsuya Yamamoto, Nagoya; Shoshiro Taneichi, Tajimi; Hisaaki Kobayashi, Minokamo, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/101,919

(22) PCT Filed: Feb. 21, 1997

(86) PCT No.: PCT/JP97/00504
§ 371 Date: Jul. 20, 1998
§ 102(e) Date: Jul. 20, 1998

(87) PCT Pub. No.: WO98/23982
PCT Pub. Date: Jun. 4, 1998

(30) Foreign Application Priority Data

Nov. 29, 1996 (JP) .................................................. 8-318383

(51) Int. Cl.⁷ ..................................................... G02B 6/02
(52) U.S. Cl. ............................ 385/127; 385/126; 385/128
(58) Field of Search ..................................... 385/126–128

(56) References Cited

U.S. PATENT DOCUMENTS

| | | | |
|---|---|---|---|
| 4,105,284 | * | 8/1978 | Olshansky .............................. 385/127 |
| 4,392,715 | * | 7/1983 | Bonewitz et al. .................... 385/142 |
| 4,505,542 | * | 3/1985 | Clarke ..................... 385/127 |
| 4,511,209 | * | 4/1985 | Skutnik ................................. 385/145 |
| 4,843,111 | * | 6/1989 | Yokoshima et al. ............. 385/128 X |
| 4,875,758 | * | 10/1989 | Masuda et al. ........................ 385/100 |
| 4,968,115 | * | 11/1990 | Kunieda et al. ...................... 385/128 |
| 5,123,076 | * | 6/1992 | Nishimoto et al. ................... 385/124 |
| 5,302,025 | * | 4/1994 | Kleinerman ........................... 374/131 |
| 5,333,234 | * | 7/1994 | Hashimoto et al. .................. 385/145 |
| 5,381,504 | * | 1/1995 | Novack et al. ....................... 385/128 |
| 5,422,182 | * | 6/1995 | Oishi et al. ....................... 385/128 R |
| 5,644,670 | * | 7/1997 | Fukuda et al. ....................... 385/124 |
| 5,748,826 | * | 5/1998 | Nagano et al. ....................... 385/128 |

FOREIGN PATENT DOCUMENTS 4-03006503 * 1/1991 (JP) .

* cited by examiner

*Primary Examiner*—Rodney Bovernick
*Assistant Examiner*—Michael J. Stahl
(74) *Attorney, Agent, or Firm*—Austin R. Miller

(57) ABSTRACT

Disclosed is a plastic-clad optical fiber (PCF) comprising a quartz core and a polymer clad as tightly formed around the core, in which the clad has a multi-layered structure of a plurality of different polymers, and the refractive index of the core ($n_{CO}$), that of the first clad as tightly formed around the core ($n_{CL1}$) and that of the second clad as tightly formed over the first clad ($n_{CL2}$) satisfy both $0.21 \leq \sqrt{(n_{CO}^2 - n_{CL1}^2)} \leq 0.35$ and $n_{CL2} < n_{CL1}$. This is a wide-band PCF which exhibits reduced loss in connection with crimp-style connectors, reduced bending loss, and lower transmission loss with temperature changes. Therefore, this PCF is useful as a light information-transmitting material in constructing ATM-LAN, high-speed Ethernet, etc.

14 Claims, No Drawings

WIDEBAND PLASTIC-CLAD OPTICAL FIBER

TECHNICAL FIELD

The present invention relates to an optical fiber favorable for middle-range and short-range, light information-transmitting materials. More precisely, it relates to a wide-band plastic-clad optical fiber favorable for light information-transmitting materials for constructing LAN (local area networks) such as high-speed and large-capacity data links for middle-range and short-range networks, and the like.

BACKGROUND ART

Step-index-type plastic-clad optical fibers (hereinafter referred to as PCF) comprising a quartz core and a plastic clad are relatively inexpensive, and, when compared with plastic optical fibers of which the core and the clad are both made of plastics, have higher light transmittance and better bondability to light-emitting and light-receiving devices and are easier to handle. For their such characteristics, PCF are much used as optical fibers for middle-range and short-range light information transmission and those in light guides.

For example, PCF described in Japanese Patent Application Laid-Open (JP-A) Hei-5-271350, of which the core is made of pure quartz and the clad is of UV-cured fluorine resin, is usable as a light information-transmitting material for intra-system communication, inter-system communication, mobile communication, intra-building communication and the like. As its clad is made of fluorine resin having high hardness, the PCF is compatible with crimp-style connectors, and field working of the PCF including connector application thereto is easy.

However, though having such excellent handlability, workability, connector applicability and bondability and being inexpensive, those conventional PCF have a large numerical aperture (NA) of from 0.37 to 0.40 and therefore their transmission band is narrow. Accordingly, for light information-transmitting materials for wide-band information transmission systems of ATM-LAN (Asynchronous Transfer Mode-LAN), high-speed Ethernet and the like, the conventional PCF are unsatisfactory as their transmission band is too narrow.

On the other hand, graded-index-type and single-mode-type optical fibers of quartz, which are known as materials for high-speed information transmission, have a wide transmission band, but require troublesome working and connector application and even complicated material designing and clad constitution. Therefore, their production costs are difficult to reduce.

Given that situation, the object of the present invention is to improve PCF which are easy to work, to which connector application is easy and for which material designing and clad constitution is easy, to thereby broaden their band with no disadvantages including contact loss for simple crimp-style connectors, bending loss and even light transmittance loss in temperature change.

DISCLOSURE OF THE INVENTION

The invention provides a plastic-clad optical fiber comprising a quartz core and a polymer clad tightly formed around the core, in which the clad has a multi-layered structure of a plurality of different polymers, and the refractive index of the core ($n_{CO}$), that of the first clad tightly formed around the core ($n_{CL1}$) and that of the second clad formed over the first clad ($n_{CL2}$) satisfy both $0.21 \leq \sqrt{(n_{CO}^2 - n_{CL1}^2)} \leq 0.35$ and $n_{CL2} < n_{CL1}$.

To realize wide-band plastic-clad optical fibers (PCF), it is necessary to lower the numerical aperture (NA=$\sqrt{(n_{CO}^2 - n_{CL}^2)}$) of the fibers. For this, in the PCF of the invention, the refractive index of the first clad ($n_{CL1}$) and that of the core ($n_{CO}$) shall satisfy $0.21 \leq \sqrt{(n_{CO}^2 - n_{CL1}^2)} \leq 0.35$.

For favorably using optical fibers in wide-band information transmission systems, their band for a transmission distance of from 100 to 200 m must be at least 156 Mbps. Conventional step-index-type PCF could hardly satisfy such a high band level. If having a reduced numerical aperture (NA) of not more than 0.35, PCF could practically satisfy the band level of at least 156 Mbps (for 100 to 200 m).

However, light passing through the core of a step-index-type optical fiber that has a small numerical aperture is easily in a radiation mode when the fiber is bent. Therefore, as so noted hereinabove, reducing the numerical aperture (NA) of PCF is problematic in that the bending loss is increased to be a great bar to the practical use of PCF. Accordingly, the lowermost limit of the numerical aperture (NA) of PCF having one clad layer is not less than 0.36 in order that the bending loss of the PCF could be on the same level (not higher than 0.35 dB) as that practically allowed for conventional PCF (having a large numerical aperture of from 0.37 to 0.40). The bending loss as referred to herein means the decrease in the quantity of light from the initial light quantity, as measured by applying an LED light source having an incident NA of 0.25 to a 3-meter optical fiber that is wound 10-fold around a mandrel having a radius of 5 mm.

Specifically, the bending characteristic of PCF is influenced not only by the refractive index of the clad that determines the numerical aperture (NA) of PCF but also by the physical properties of the polymer that forms the clad and by the degree of dispersion in the clad coating condition in the lengthwise direction. Therefore, too much reduction in the numerical aperture (NA) of PCF to lower than 0.36 shall have greater negative influences on the bending characteristic of PCF, which is much more influenced by the physical properties of the clad polymer and by the clad coating condition, resulting in that PCF having such a small numerical aperture (NA) could no more have a stable bending characteristic necessary for its practical use.

For these reasons, the lowermost limit of the numerical aperture (NA) of PCF having one clad layer is not less than 0.36 in order that the PCF could have a stable bending characteristic.

However, in PCF, when a second clad, of which the refractive index satisfies $n_{CL2} < n_{CL1}$, is formed around the first clad, the increase in the bending loss of PCF could be prevented even if the numerical aperture of the first clad [$\sqrt{(n_{CO}^2 - n_{CL1}^2)}$] is reduced to fall between 0.21 and 0.35. This is because, when the optical fiber is bent, the radiation mode once produced in the interface between the core and the first clad is completely reflected on the interface between the first clad and the second clad and is thereby returned back. As opposed to this, however, when $n_{CL2} \geq n_{CL1}$, the radiation mode could not be completely reflected on the interface between the first clad and the second clad, resulting in that the radiant light is radiated out of the optical fiber and is lost. In that case, the second clad could not exhibit the function to prevent the increase in the bending loss of the optical fiber.

Reducing the numerical aperture (NA) of PCF to broaden the band thereof is problematic, as increasing the caulking loss when crimp-style connectors are fitted to the outer surface of the clad by caulking. To overcome this problem and to realize practical use of such PCF, the connector caulking loss must be reduced to the same level (not more than 0.5 dB) as that for conventional PCF (having a large numerical aperture of from 0.37 to 0.40). For PCF having one clad layer, however, if they are desired to have a caulking loss of not more than 0.5 dB (at incident NA of 0.20 in full-mode excitation), like conventional PCF, irrespective of the composition and the physical properties of the clad, the degree of dispersion in the clad coating condition in the lengthwise direction and even the type of the crimp-style connectors used, the lowermost limit of the numerical aperture (NA) of those PCF shall be not less than 0.36. If the lowermost limit is less than 0.36, the influences of the composition and the physical properties of the clad and of the degree of dispersion in the clad coating condition in the lengthwise direction on the characteristics of PCF are not negligible, and practical PCF with stable characteristics are difficult to obtain.

However, the multi-layered PCF of the invention, of which the second clad has a refractive index falling within a specific range, may have a lowered caulking loss even if the numerical aperture of the first clad thereof is lowered to fall between 0.21 and 0.35.

In addition, the second clad, of which the refractive index is smaller than that of the first clad, is extremely effective not only for reducing the bending loss and the caulking loss of the PCF but also for broadening the band thereof.

Specifically, in the multi-layered PCF of the invention, of which the second clad has a refractive index falling within a specific range, light having bled and leaked out of the core is reflected on the interface between the first clad and the second clad and is returned back in lower modes, even though it passes through the first clad. On the other hand, in higher modes, light having leaked out of the core and passed through the first clad to reach the second clad is attenuated by the great light loss in the second clad, and, after having been reflected on the outer surface of the second clad, is again reflected on the interface between the first clad and the second clad and is much more greatly attenuated. Accordingly, as compared with that in conventional PCF, the transmission loss in the multi-layered PCF of the invention in lower modes is greatly reduced, while the filter characteristic of the PCF of the invention is much improved. As a result, the PCF of the invention can realize long-range and wide-band transmission.

As in the above, the PCF of the invention is a wide-band PCF having a small numerical aperture, and is characterized in that its bending loss is reduced to a practical level and that its contact loss with crimp-style connectors is also reduced to a practical level. Thus, the PCF of the invention has good light information-transmitting characteristics favorable for middle-range and short-range, wide-band transmission.

BEST MODES OF CARRYING OUT THE INVENTION

In order to make the first clad have a small numerical aperture (NA) of from 0.21 to 0.35, for example, polymers having a higher refractive index, as compared with those for conventional PCF, will be used for forming the first clad so that the first clad may have a refractive index falling between 1.415 and 1.443 or so when the quartz core has a refractive index of 1.458.

Preferably, the refractive indices of the core, the first clad and the second clad ($n_{CO}$, $n_{CL1}$ and $n_{CL2}$, respectively) satisfy the condition of $\sqrt{(n_{CO}^2-n_{CL2}^2)} \geq [\sqrt{(n_{CO}^2-n_{CL1}^2)}+$ 0.03] in order that the entire reflection on the interface between the first clad and the second clad is much more ensured. This condition is especially effective when the numerical aperture of the first clad is especially lowered to less than 0.30. Also preferably, the ratio of $n_{CL2}/n_{CL1}$ is at least 0.95 or more.

It is desirable that the polymers to form the first clad and the second clad of the wide-band PCF of the invention have a high hardness, after having been cured by UV, of not less than 60 in terms of the Shore hardness as measured according to the Shore hardness D method (ASTM-D2240).

It is also desirable that the hardness of the polymers for the clads is relatively low in order to prevent the optical fiber from being broken or cracked to cause fatigue breakage when a crimp-style connector is fitted to the side surface of the optical fiber by directly caulking them via a connector ferrule therebetween. However, if the Shore hardness D of the polymers is from 50 to 55 or so or even lower than the range, the caulking fixation of the ferrule to the optical fiber could not be sufficiently increased. If so, when the optical fiber is cut, the possibility of mirror-finishing of the cut surface of the quartz core will be lowered.

On the other hand, when high-hardness polymers having a Shore hardness D of not less than 60, preferably from D60 to D85 are used to form the clads, the caulking stress could be well absorbed by the polymer clad layers, and therefore connectors could be more firmly fixed to the optical fiber. Using the polymers having a hardness of such a degree does not cause breakage or fatigue breakage of the optical fiber, and is advantageous in that, when the optical fiber is cut, the impact by the cutting tool as pressed against the optical fiber is well propagated through the clads to reach the quartz core, resulting in that the core is sharply cut to have a mirror-finished surface. As a result, the cut surface of the optical fiber may be extremely smooth and flat, and the thus-cut optical fibers could be connected without being polished.

Also preferably, the polymers to form the first and second clads have a linear expansion coefficient at room temperature of from $1.0 \times 10^{-4}$ to $2.3 \times 10^{-4}$. If their linear expansion coefficient is less than $1.0 \times 10^{-4}$, the polymers will be too brittle and are unfavorable. Even though having good adhesiveness to the core, the clads of such brittle polymers will be easily peeled from the core by some mechanical shock including thermal shock and bending.

On the contrary, if the linear expansion coefficient of the polymer to form the first clad is more than $2.3 \times 10^{-4}$, the refractive index of the clad will be large in a low-temperature range, since $dn_{CL}/dT$ (temperature coefficient of clad refraction) is proportional to $d\rho/dT$ (linear expansion coefficient). If so, the numerical aperture (NA) of the optical fiber is greatly lowered, and, as a result, the transmission loss in the optical fiber at low temperatures will be greatly increased. On the other hand, if the linear expansion coefficient of the polymer to form the second clad is more than $2.3 \times 10^{-4}$, the micro-bending loss in the optical fiber will increase due to the polymer shrinkage at low temperatures. If so, the transmission loss at low temperatures will also be increased.

For these reasons, therefore, in the wide-band PCF having a lowered numerical aperture (NA) to fall within the defined range and having a multi-layered polymer clad structure, it is desirable that the linear expansion coefficient of the first and second clads falls between $1.0 \times 10^{-4}$ and $2.3 \times 10^{-4}$, in order that the optical fiber may have good mechanical characteristics and good low-temperature characteristics.

Also desirably, the Young's modulus of the polymer to form the first clad and that of the polymer to form the second clad are between 30 and 65 kg/mm² and between 15 and 60 kg/mm², respectively. In general, UV-cured, fluorine-containing (meth)acrylate resins for clads having a higher hardness shall have a higher Young's modulus. However, the resins having a Young's modulus higher than the defined range are poorly elongatable. If they are used to form the clads of optical fibers, and when the optical fibers are cut, they are often cracked. Using the resins having such a high Young's modulus produces one factor that increases the optical fiber connection loss. As so noted hereinabove, even though the polymers for the clads are to have a higher hardness so as to enhance the caulking characteristic of the optical fibers, it is still desirable that the polymers have a low Young's modulus. As a whole, therefore, in order to obtain optical fibers having good connection characteristics, the Young's modulus of the polymers to form the clads is preferably on the level falling within the range noted above. Using the polymers will ensure mirror-finished cut of the quartz core and good connection of the thus-cut optical fibers without requiring polishing. If polymers having a Young's modulus lower than the defined range are used to form the clads, the possibility of mirror-finishing of the cut surface of the quartz core will be lowered when the optical fiber is cut, even though the polymers used have a high hardness.

When satisfying the Shore hardness, the linear expansion coefficient and the Young's modulus to fall within the defined ranges, the wide-band PCF having a plurality of clad layers is well crimped and caulked and has good mechanical characteristics and good low-temperature characteristics.

The first and second clads to be formed around the quartz core are desirably made of UV-cured, fluorine-containing (meth)acrylate resins, as their refraction can be well controlled to fall within a desired range. For example, the clads are formed by applying an UV-curable, fluorine-containing (meth)acrylate polymer precursor composition to the surface of a quartz core by coating or dipping, followed by exposing it to UV rays to thereby polymerize and cure the polymer precursor around the core.

Regarding the thickness of each clad layer of the optical fiber of the invention, it is desirable that the thickness (D1) of the first clad and that (D2) of the second clad are both not less than 5 μm and that the total of the thicknesses (D1+D2) is not more than 20 μm.

If the thickness of each clad layer is less than 5 μm, the degree of eccentricity between the quartz core and each clad is difficult to control within a preferred range. If so, when the optical fiber is cut, each clad will be cracked or peeled from the core, and good mirror-finished surfaces are difficult to obtain. In addition, when crimp-style connectors are fitted to the optical fiber by caulking, the clads could not satisfactorily absorb the caulking force so that the optical fiber will be broken or fatigued. In that case, the connectors could not be firmly fitted to the optical fiber.

If the total of the thickness (D1) of the first clad and that (D2) of the second clad is more than 20 μm, the microbending loss in the quartz core will increase due to the shrinkage of the clads when the optical fiber is kept at low temperatures. The total of the thicknesses overstepping the defined range is therefore problematic and unfavorable.

One typical example of quartz to form the core of the optical fiber of the invention is pure quartz. Apart from this, also employable herein are doped quartz and multi-component quartz compositions containing alkali metals, etc.

As the polymers for the first and second clads of the optical fiber of the invention, preferred are UV-curable resins, as they are easy to handle for coating and are rapidly curable, and are therefore suitable to high-speed production of fibers. More preferred are UV-cured, fluorine-containing (meth)acrylate resins, as their refraction is easy to control within a desired range. For the UV-cured, fluorine-containing (meth)acrylate resins which are preferably used herein, for example, referred to is the technique for polymer precursor compositions for clads, which is disclosed in U.S. Pat. No. 4,511,209. According to the disclosed technique, essential monomers of fluoroalkyl-containing (meth)acrylates are combined with mono-functional or poly-functional, alkyl-containing (meth)acrylate comonomers in an optimized mixing ratio to obtain the polymers having desired properties.

Examples of the monomers for forming the polymers are mentioned below.

The essential monomers of fluoroalkyl-containing (meth)acrylates include the following:

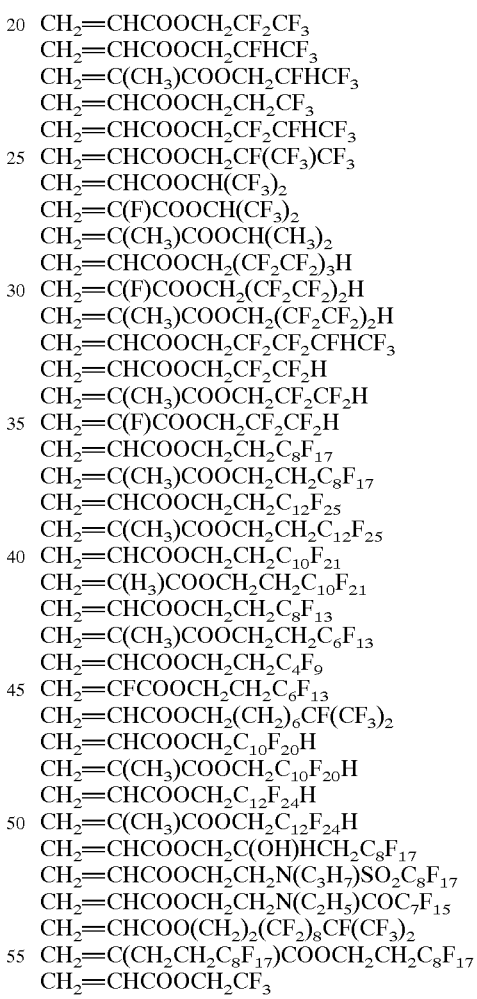

Mixtures of two or more those fluoroalkyl-containing (meth)acrylates having different structures may be used.

The mono-functional comonomers of alkyl-containing (meth)acrylates capable of being combined with such essential monomers include the following:

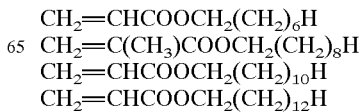

and also alicyclic alkyl-containing (meth)acrylates.

The poly-functional comonomers include the following:

Ethylene glycol di(meth)acrylate,
Diethylene glycol di(meth)acrylate,
Triethylene glycol di(meth)acrylate,
Polyethylene glycol di(meth)acrylate (number-average molecular weight: 200to 1000),
Propylene glycol di(meth)acrylate,
Dipropylene glycol di(meth)acrylate,
Tripropylene glycol di(meth)acrylate,
Polypropylene glycol di(meth)acrylate (number-average molecular weight: 200to 1000),
Neopentyl glycol di(meth)acrylate,
1,3-Butanediol di(meth)acrylate,
1,4-Butanediol di(meth)acrylate,
1,6-Hexanediol di(meth)acrylate,
Hydroxypivalate-neopentyl glycol di (meth)acrylate,
Bisphenol A di(meth)acrylate,
Pentaerythritol tri(meth)acrylate,
Dipentaerythritol hexa(meth)acrylate,
Pentaerythritol tetra(meth)acrylate,
Trimethylolpropane tri(meth)acrylate,
Pentaerythritol-monohydroxy penta(meth)acrylate,
$CH_2=CHCOOCH_2(C_2F_4)_2CH_2OCOCH=CH_2$
$CH_2=CHCOOC_2H_4(C_2F_4)_3C_2H_4OCOCH=CH_2$
$CH_2=C(CH_3)COOC_2H_4(C_2F_4)_3C_2H_4OCOC(CH_3)=CH_2$ It is desirable that the curable monomer compositions for clad polymers (polymer precursor compositions for clads) for use in the invention have a viscosity of from 10 to 2000 cps or so, in view of their handlability in applying them onto the surface of the quartz core. For room temperature application, it is desirable that the compositions have a viscosity of from 15 to 200 cps. The compositions may be applied to the optical fiber core with heating or cooling them to control their viscosity.

If desired, the polymer precursor compositions for clads may contain, in addition to the essential monomers of fluoroalkyl-containing (meth)acrylates and the mono-functional or poly-functional comonomers of alkyl-containing (meth)acrylates noted above, any other various additives within the acceptable range for the curing condition and the miscibility, but preferably, they do not substantially contain high-molecular products formed by polymerization.

The optional additives include, for example, antioxidants and light resistance improvers such as hindered phenols, etc.; coupling agents for improving the adhesiveness and bondability to quartz cores; anti-foaming agents, leveling agents and surfactants for enhancing uniform application to quartz cores, etc.

The coupling agents include silane coupling agents, titanium coupling agents, zirco-aluminate coupling agents, etc. Of those, preferred are silane coupling agents such as γ-aminopropyltriethoxysilane,
γ-methacryloxypropylmethoxysilane,
γ-acryloxypropyltrimethoxysilane,
γ-mercaptopropyltrimethoxysilane, etc.

The photopolymerization initiator to be in the polymer precursor compositions for clads includes, for example, benzophenone, acetophenone, benzoin, benzoin ethyl ether, benzoin isobutyl ether, benzyl methyl ketal, azobisisobutyronitrile, hydroxycyclohexyl phenyl ketone, 2-hydroxy-2-methyl-1-phenylpropan-1-one, etc. The initiator content may be from 0.1to 5% by weight. If desired, the photopolymerization initiator may be combined with a photosensitizer, which includes, for example, amine compounds and phosphorus compounds.

Preferably, the precursor composition for the first clad contains a coupling agent such as γ-mercaptopropyltrimethoxysilane or the like, by which the adhesiveness between the core and the first clad is improved to have an increased Weibull mean breaking strength of not less than 400 kg/mm$^2$, and the strength reliability of PCF is increased. The amount of the coupling agent to be added is preferably from 0.1 to 3.0%.

The high-molecular products formed by polymerization, which the polymer precursor compositions for clads do not substantially contain, include oligomers (dimers or higher oligomers) and polymers to be formed by vinyl polymerization of the monomer components in those compositions such as those noted above. The precursor compositions which do not substantially contain such high-molecular products formed by polymerization may generally have a low viscosity of from 10 to 100 cps or so.

Using the polymer precursor compositions substantially not containing the high-molecular products formed by polymerization is preferred, as increasing the adhesiveness between the multi-layered clads which are formed in a process comprising applying a first composition to a core, UV-curing it, further applying the next composition over the UV-cured layer, and UV-curing it in that order. This is effective for evading the problems of interfacial peeling and edge cracking to occur in working PCF. This effect is especially noticeable when fluorine-containing monomers are used as the essential monomers.

In order to further augment the effect, the UV radiation strength, the UV dose and the flow rate of nitrogen purge gas for curing promotion are preferably so controlled in the process comprising continuous application of the polymer precursor composition for the first clad to the surface of the core substrate followed by UV exposure of the composition using a UV-exposing device to cure it, that the degree of curing may fall between 50 and 90%. By controlling the degree of curing in that manner, the cured layer may still contain a suitable amount of the monomer component that is necessary for increasing the adhesiveness of the first clad and the second clad to be formed thereover. In that manner, therefore, the adhesiveness between the first clad component and the second clad component is promoted. This will be because an extremely thin mixed polymer layer could be formed in the interface between the first clad and the second clad.

In addition, the polymer precursor compositions for clads which do not substantially contain high-molecular products formed by polymerization are further effective for improving the transparency and the mechanical characteristics of the clads formed.

The optical fiber having a plurality of clads formed in the manner mentioned above is coated with a barrier layer. As the polymer for the barrier layer, usable is any of thermoplastic resins such as polyamide resins (e.g., nylon 11, nylon 12) and fluorine resins (e.g., ethylene/tetrafluoroethylene copolymer), and UV-curable resins such as rigid urethane acrylate resins.

Where the clads are made of UV-cured fluorine-containing (meth)acrylate resins such as those mentioned above, and the numerical aperture of the first clad is reduced to be less than 0.30, the transmission loss in the optical fiber will greatly fluctuate depending on the ambient temperature change. In order to prevent the transmission loss fluctuation, it is effective to provide a stress buffer layer of an energy-cured polymer between the clad and the barrier layer in such a manner that the stress buffer layer is tightly contacted with the outer surface of the clad.

The polymer for the stress buffer layer may be any of thermoplastic polymers and UV-curable polymers, but is preferably a soft polymer having a Shore hardness A of less than 80. Especially preferred are UV-curable silicone resins, urethane acrylate resins and the like.

Further preferably, the polymer for the stress buffer layer has a 90°-peeling force of not more than 45 g/cm, more preferably between 25 and 45 g/cm. This is because, if the adhesiveness between the clad and the stress buffer layer is too strong when the stress buffer layer is removed for applying crimp-style connectors to the optical fiber, the stress buffer layer is difficult to completely remove but will partly remain on the clad. If so, the working to fit the PCF into the connector ferrule will be difficult. In addition, the adhesiveness between the clad and the stress buffer layer will have a great influence on the transmission loss, especially on the transmission loss caused by the ambient temperature change. Therefore, in order to improve the low-temperature characteristics of the optical fiber, it is desirable to use polymers having small peeling force, as so noted hereinabove. However, if the adhesiveness between the clad and the stress buffer layer is too low, the bare fiber portion will protrude out from the edge of the PCF coated with the barrier layer (pistoning). The problem of such pistoning is unfavorable. Accordingly, the 90°-peeling force of the polymer for the stress buffer layer is preferably at least 25 g/cm.

The 90°-peeling force of the polymer may be obtained according to the method mentioned below. A sample of the polymer or a curable composition containing the polymer is applied onto a multi-component glass sheet, and solidified or cured through UV exposure of 200 mJ to form a film thereon having a thickness of 200 $\mu$m. Then, the film is peeled in the direction of 90°, whereupon the resistance against the peeling (g/cm) is measured.

Where the stress buffer layer is provided, it is desirable that its outer diameter (DS) and the diameter of the barrier layer (DB) satisfy the condition of $0.3 \leq (DS-DCL)/(DB-DCL) \leq 0.7$ (where DCL is the outer diameter of the clad, and DB is the outer diameter of the barrier layer). If the ratio is less than 0.3, the negative influence of the shrinkage stress of the barrier layer on the bare fiber portion is difficult to fully remove. On the contrary, however, if the ratio is more than 0.7, the thickness of the barrier layer is so thin that the barrier layer could not satisfactorily exhibit its essential function to prevent the transmission of the side pressure and the outer force to the bare fiber portion.

The stress buffer layer is effective for retarding the micro-bending loss in the optical fiber at room temperatures. Therefore, the layer is especially effective when the optical fiber has a small numerical aperture (NA) or when the linear expansion coefficient of the polymer for the clad greatly differs from that of the polymer for the barrier layer.

The optical fiber of the invention can be produced in any ordinary method for producing PCF. Briefly, a quartz material for the core is polished with flames or pre-treated with hydrofluoric acid, and then melted and formed into a thin optical fiber substrate in a high-frequency heating furnace or an electric resistance carbon furnace or by means of oxy-hydrogen flames. Next, this optical fiber substrate is passed through a clad-coating die to which is continuously fed a liquid polymer precursor composition for clads, so that it is continuously coated with the composition. Then, after the solvent is optionally removed, the thus-coated substrate is exposed to UV rays to thereby polymerize and cure the clad composition. In that manner or the like, the first clad is formed around the quartz core. Next, in the same manner as above, the second clad is formed over the first clad. If desired, a third clad and a stress buffer layer may be formed over the second clad also in the same manner as above.

The light source to be used herein for UV radiation to polymerize and cure the polymer precursor composition for clads may be any commercially-available one, including, for example, carbon arc lamps, xenon lamps, middle-pressure mercury lamps, ultra-high-pressure mercury lamps, non-electrode lamps, metal halide lamps, etc. In order to enhance the polymerization efficiency, it is desirable to effect the UV exposure in an inert gas atmosphere such as nitrogen gas or the like. In that manner, a plurality of clad layers of at least the first clad and the second clad are formed around the core, and then a stress buffer layer is optionally formed over the multi-layered clad. Then, the thus-formed PCF is taken out via a roller of which the running speed is controlled, and optionally this is coated with a resin composition having a protecting function to form a barrier layer thereover. Finally, this is wound up.

EXAMPLES

The physical data referred to in the following Examples and Comparative Examples were measured according to the methods mentioned below.

Bending Loss (dB)

Light was applied to a 3-meter optical fiber sample from a light source at an incident NA of 0.25 in full-mode excitation, and the light transmittance through the sample was measured using a light-receiving device, Silicon Photomal. This is the initial transmittance. Next, the sample was wound 10-fold around a mandrel having a radius of 5 mm, and the light transmittance therethrough was measured. The difference between the initial transmittance and the transmittance through the wound sample is obtained, which indicates the bending loss.

Caulking Loss (dB)

A connector was fitted to a 3-meter optical fiber sample with neither bonding nor caulking, and the light transmittance through the optical fiber was measured using a 850-nm LED light source (at incident NA of 0.20 in full-mode excitation). This is the initial transmittance. Next, a crimp-style connector was fitted to one end of the optical fiber by caulking the outer periphery of the second clad of the optical fiber and the ferrule of the connector, and the light transmittance through the optical fiber was measured. The difference between the initial transmittance and the transmittance through the caulked sample is obtained, which indicates the caulking loss.

Low-temperature Characteristic (dB)

The light transmittance through a 200-meter optical fiber sample was measured at 25° C. and 50% RH. Next, the sample was left at a low temperature of −20° C., and the light transmittance therethrough was measured. The difference between the two data indicates the transmission loss in the sample at the low temperature of −20° C., by which the low-temperature characteristic of the sample is validated.

Cracking and Peeling of Clads, and Mirror-finishing Ratio (%) of Cut Surface

An optical fiber sample was cut with a cutter of CT-2 Model (manufactured by SpecTran Specialty Optics Company) (n=100), and the cut surface of each fiber pieces was observed with a microscope to check whether or not the clads were cracked and whether or not the clads were peeled, and to measure the ratio of the pieces with a mirror-finished surface.

Example 1

A synthetic quartz material produced by a plasma method was pre-treated by flame polishing with oxyhydrogen flames, and then continuously fed into a high-purity carbon resistance-heating furnace at 2200° C., in which the material was melted and formed into a thin optical fiber substrate (core) having a diameter of 200 μm. A polymer precursor composition for a first clad (composition A mentioned below; 18 cps) was filtered through a 0.1-μm filter, and then fed into a clad-coating die, through which the substrate was continuously coated with the composition. Then, the thus-coated substrate was exposed to light from a non-electrode lamp (300 W/inch; center wavelength: 360 nm), by which the composition was cured to form a first clad (outer diameter: 216 μm) of a UV-cured fluoroacrylate resin (refractive index: 1.440).

| Composition A: | |
|---|---|
| 2-(Perfluorooctyl)ethyl acrylate | 30 wt. pts. |
| 2,2,3,3-Tetrafluoropropyl acrylate | 40 wt. pts. |
| Trimethylolpropane triacrylate | 30 wt. pts. |
| γ-mercaptopropyltrimethoxysilane | 1 wt. pt. |
| Photopolymerization initiator (2-hydroxy-2-methyl-1-phenylpropan-1-one) | 0.48 wt. pts. |

Next, while the degree of curing of the first clad was 75%, a polymer precursor composition for a second clad (composition B mentioned below; 18 cps) was applied over the first clad and cured in the same manner as above to form a second clad (outer diameter: 230 μm) of a UV-cured fluoroacrylate resin (refractive index: 1.409).

| Composition B: | |
|---|---|
| 1,1,1-Trihydroperfluoroundecyl acrylate | 65 wt. pts. |
| 2,2,3,3-Tetrafluoropropyl acrylate | 10 wt. pts. |
| Trimethylolpropane triacrylate | 25 wt. pts. |
| Photopolymerization initiator (same as above) | 0.50 wt. pts. |

Next, a stress buffer layer (outer diameter: 330 μm) of a UV-cured urethane acrylate resin (refractive index: 1.438) was formed around the second clad in the same manner as above. Then, a polymer melt of ethylene/tetrafluoroethylene copolymer was applied over this to form a barrier layer (outer diameter: 500 μm). The thus-produced optical fiber was wound up.

The refractive indices of the quartz core and the first clad of the optical fiber were measured to be 1.458 and 1.440, respectively. The numerical aperture (NA) of the first clad was 0.23. The degree of core/clad eccentricity was 4.0%; and the degrees of non-circularity of the quartz core and the polymer clad were 0.5% and 0.8%, respectively, which indicate that the optical fiber has an extremely high degree of circularity.

The Shore D hardness, the Young's modulus (23° C.) and the linear expansion coefficient of the first clad were D65, 48 kg/mm$^2$ and $1.8 \times 10^{-4}$, respectively; and the Shore D hardness, the Young's modulus (23° C.) and the linear expansion coefficient of the second clad were D77, 45 kg/mm$^2$ and $2.0 \times 10^{-4}$, respectively. The stress buffer layer had a Shore A hardness of A60, and a 90°-peeling force of 30 g/cm.

The transmission loss in the optical fiber obtained herein was 5.6 dB/km at a wavelength of 850 nm, and 7.9 dB/km at 650 nm. The transmission speed of the 200-meter fiber was 180 Mbps. Thus, the optical characteristics of the optical fiber were very good.

The caulking loss in the optical fiber to which a crimp-style connector was fitted by caulking was 0.42 dB. As having such a small caulking loss, the optical fiber was good. When the optical fiber was wound 10-fold around a mandrel having a radius of 5 mm, the bending loss in the thus-wound fiber was 0.28 dB, and was small like in conventional PCF (numerical aperture: 0.37 to 0.40). This indicates that the bending characteristic of the optical fiber obtained herein is good. Regarding the low-temperature characteristic of the optical fiber at −20° C., the transmission loss in the fiber at −20° C. was 1.27 dB relative to the transmittance through the fiber at 25° C. This indicates that the low-temperature characteristic of the optical fiber obtained herein is comparable to that of conventional PCF, and is good.

At the cut surface of the optical fiber, the clads were neither cracked nor peeled, and the mirror-finishing ratio of the cut surface was 99% and was extremely high.

Example 2 and Comparative Examples 1 to 3

Optical fibers were produced and evaluated in the same manner as in Example 1, except that the polymer precursor compositions for the first and second clads as well as the resin for the stress buffer layer and the thickness of the layer were so varied as to satisfy the conditions shown in Table 1(1) and Table 1(2) (in Example 2, and Comparative Examples 1 and 3), and that the second clad was not formed but the thickness of the first clad was increased (in Comparative Example 2). The data of those optical fibers are shown in Table 1(2).

The optical fibers of the invention were all practical wide-band PCF, as their transmission speed was high, and the transmission loss, the bending loss and the caulking loss were all small in them.

As opposed to those, the optical fiber of Comparative Example 1 in which the refractive index of the second clad was higher than that of the first clad, the optical fiber of Comparative Example 2 not having the second clad, and the optical fiber of Comparative Example 3 of which the numerical aperture was too small were all unsuitable to practical use, since the bending loss and the caulking loss in them were large.

TABLE 1

| | Example 1 | Example 2 | Comparative Example 1 | Comparative Example 2 | Comparative Example 3 |
|---|---|---|---|---|---|
| Core diameter (μm) | 200 | 200 | 200 | 200 | 200 |
| Refractive index of 1st clad ($n_{CL1}$) | 1.440 | 1.433 | 1.433 | 1.440 | 1.445 |
| NA of fiber | 0.23 | 0.27 | 0.27 | 0.23 | 0.19 |

TABLE 1-continued

|  | Example 1 | Example 2 | Comparative Example 1 | Comparative Example 2 | Comparative Example 3 |
|---|---|---|---|---|---|
| Outer diameter of 1st clad ($\mu$m) | 216 | 218 | 218 | 228 | 218 |
| Thickness of 1st clad ($\mu$m) | 8 | 9 | 9 | 14 | 9 |
| Refractive index of 2nd clad ($n_{CL2}$) | 1.409 | 1.400 | 1.440 | — | 1.409 |
| Outer diameter of 2nd clad ($\mu$m) | 230 | 230 | 230 | — | 230 |
| Thickness of 2nd clad ($\mu$m) | 7 | 6 | 6 | 0 | 6 |
| $n_{CL2}/n_{CL1}$ | 0.978 | 0.977 | 1.004 | — | 0.975 |
| Shore hardness of 1st clad | D65 | D61 | D61 | D65 | D76 |
| Shore hardness of 2nd clad | D77 | D66 | D64 | — | D77 |
| Young's modulus of 1st clad (kg/mm$^2$) | 48 | 45 | 45 | 48 | 70 |
| Young's modulus of 2nd clad (kg/mm$^2$) | 45 | 17 | 12 | — | 45 |
| Linear expansion coefficient of 1st clad ($\times 10^{-4}$) | 1.8 | 1.4 | 1.4 | 1.8 | 2.2 |
| Linear expansion coefficient of 2nd clad ($\times 10^{-4}$) | 2.0 | 1.8 | 0.9 | — | 2.0 |
| Resin of stress buffer layer | UV-curable silicone resin | UV-curable urethane acrylate resin | UV-curable silicone resin | UV-curable urethane acrylate resin | UV-curable urethane acrylate |
| Outer diameter of stress buffer layer ($\mu$m) | 330 | 400 | 330 | 400 | 400 |
| Hardness of stress buffer layer | A60 | A50 | A60 | A50 | A50 |
| 90°-peeling force of stress buffer layer (g/cm) | 30 | 25 | 30 | 22 | 25 |
| $(D_S-D_{CL})/(D_B-D_{CL})$ | 0.37 | 0.63 | 0.37 | 0.63 | 0.63 |
| Transmission loss (dB/km) (wavelength: 850 nm) | 5.6 | 5.1 | 5.2 | 5.3 | 6.4 |
| Transmission loss (dB/km) (wavelength: 650 nm) | 7.9 | 7.0 | 7.3 | 7.4 | 8.7 |
| Transmission speed (Mbps) | 180 (200 m) | 183 (150 m) | 164 (150 m) | 173 (200 m) | 205 (200 m) |
| Bending loss (dB) | 0.28 | 0.19 | 1.28 | 2.10 | 0.58 |
| Caulking loss (dB) | 0.42 | 0.32 | 0.95 | 1.20 | 0.87 |
| Low-temperature characteristic (dB) | 1.27 | 0.99 | 1.60 | 1.21 | 1.42 |
| Cracking of clads | No | No | Yes | No | Yes |
| Peeling of clads | No | No | Yes | No | No |
| Mirror-finishing ratio of cut surface (%) | 99 | 95 | 59 | 97 | 93 |

Example 3

An optical fiber was produced in the same manner as in Example 1, except that the following composition C was used as the polymer precursor composition for the first clad and that the barrier layer was formed directly on the second clad without forming the stress buffer layer to make the fiber have an outer diameter of 500 $\mu$m. The numerical aperture (NA) of the first clad of this fiber was 0.33.

| Composition C: | |
|---|---|
| 2-(Perfluorooctyl)ethyl acrylate | 49 wt. pts. |
| 2,2,3,3-Tetrafluoropropyl acrylate | 31 wt. pts. |
| Trimethylolpropane triacrylate | 20 wt. pts. |
| $\gamma$-mercaptopropyltrimethoxysilane | 1 wt. pt. |
| Photopolymerization initiator (2-hydroxy-2-methyl-1-phenylpropan-1-one) | 0.48 wt. pts. |

As in Table 2, the optical fiber obtained herein was a practical wide-band PCF, as its transmission speed was high, and the transmission loss, the bending loss and the caulking loss in this were all small.

Examples 4 and 5, and Comparative Examples 4 and 5

Optical fibers were produced and evaluated in the same manner as in Example 3, except that the type and the thickness of the first clad were varied and/or the thickness of the first clad was increased without forming the second clad, as in Table 2. The data of those optical fibers are shown in Table 2.

The optical fibers of the invention were all practical wide-band PCF, as their transmission speed was high, and the transmission loss, the bending loss and the caulking loss were all small in them.

As opposed to those, the optical fibers of Comparative Examples 4 and 5 not having the second clad were both unsuitable to practical use, since the bending loss and the caulking loss in the fiber having a small numerical aperture of 0.33 were large. Regarding the fiber having a large numerical aperture of 0.37, its transmission speed for 100 m was 160 Mbps on average and was high, but some samples of the fiber often showed a low transmission speed of lower than 156 Mbps. Thus, the transmission speed of the fiber fluctuated and was not stable.

TABLE 2

|  | Example 3 | Example 4 | Example 5 | Comparative Example 4 | Comparative Example 5 |
|---|---|---|---|---|---|
| Core diameter ($\mu$m) | 200 | 200 | 200 | 200 | 200 |
| Refractive index of 1st clad ($n_{CL1}$) | 1.420 | 1.415 | 1.424 | 1.420 | 1.409 |

TABLE 2-continued

|  | Example 3 | Example 4 | Example 5 | Comparative Example 4 | Comparative Example 5 |
|---|---|---|---|---|---|
| NA of optical fiber | 0.33 | 0.35 | 0.31 | 0.33 | 0.37 |
| Outer diameter of 1st clad ($\mu$m) | 216 | 216 | 216 | 225 | 225 |
| Thickness of 1st clad ($\mu$m) | 8 | 8 | 8 | 12.5 | 12.5 |
| Refractive index of 2nd clad ($n_{CL1}$) | 1.409 | 1.409 | 1.409 | — | — |
| Outer diameter of 2nd clad ($\mu$m) | 230 | 230 | 230 | — | — |
| Thickness of 2nd clad ($\mu$m) | 7 | 7 | 7 | — | — |
| $n_{CL2}/n_{CL1}$ | 0.992 | 0.996 | 0.989 | — | — |
| Shore hardness of 1st clad | D80 | D78 | D77 | D80 | D77 |
| Shore hardness of 2nd clad | D77 | D78 | D77 | — | — |
| Young's modulus of 1st clad (kg/mm$^2$) | 40 | 42 | 41 | 40 | 45 |
| Young's modulus of 2nd clad (kg/mm$^2$) | 45 | 45 | 48 | — | — |
| Linear expansion coefficient of 1st clad ($\times 10^{-4}$) | 2.1 | 2.0 | 1.9 | 2.1 | 2.1 |
| Linear expansion coefficient of 2nd clad ($\times 10^{-4}$) | 2.1 | 2.1 | 2.1 | — | — |
| Transmission loss (dB/km) (wavelength: 850 nm) | 5.2 | 5.6 | 5.2 | 5.3 | 4.5 |
| Transmission loss (dB/km) (wavelength: 650 nm) | 7.1 | 7.8 | 7.3 | 7.1 | 6.5 |
| Transmission speed (Mbps) | 192 (100 m) | 178 (100 m) | 200 (100 m) | 192 (100 m) | 160 (100 m) |
| Bending loss (dB) | 0.17 | 0.15 | 0.20 | 0.71 | 0.15 |
| Caulking loss (dB) | 0.33 | 0.30 | 0.36 | 1.80 | 0.30 |
| Mirror-finishing ratio of cut surface (%) | 97 | 96 | 97 | 98 | 94 |

Examples 6 to 9

Optical fibers were produced and evaluated in the same manner as in Example 1, except that the polymer precursor compositions for the first and second clads as well as the thicknesses of the clads were so varied as to satisfy the conditions shown in Table 3(1) and Table 3(2). The data of those optical fibers are shown in Table 3(2).

The bending loss and the caulking loss in those fibers were small. However, as not satisfying the requirements of claims 4, 6, 7 and 8, the fibers were somewhat unsatisfactory in that the clads of some of them cracked and peeled and that the mirror-finishing ratio of their cut surfaces was relatively low.

TABLE 3

|  | Example 6 (compared with claim 4) | Example 7 (compared with claim 6) | Example 8 (compared with claim 7) | Example 9 (compared with claims 8 and 15) |
|---|---|---|---|---|
| Core diameter ($\mu$m) | 200 | 200 | 200 | 200 |
| Refractive index of 1st clad ($n_{CL1}$) | 1.429 | 1.442 | 1.440 | 1.433 |
| NA of fiber | 0.29 | 0.22 | 0.23 | 0.27 |
| Outer diameter of 1st clad ($\mu$m) | 218 | 216 | 216 | 222 |
| Thickness of 1st clad ($\mu$m) | 9 | 8 | 8 | 11 |
| Refractive index of 2nd clad ($n_{CL2}$) | 1.400 | 1.409 | 1.409 | 1.400 |
| Outer diameter of 2nd clad ($\mu$m) | 230 | 230 | 230 | 230 |
| Thickness of 2nd clad ($\mu$m) | 6 | 7 | 7 | 4 |
| $n_{CL2}/n_{CL1}$ | 0.980 | 0.977 | 0.978 | 0.977 |
| Shore hardness of 1st clad/ | D50 | D61 | D63 | D61 |
| Shore hardness of 2nd clad | D66 | D78 | D77 | D66 |
| Young's modulus of 1st clad (kg/mm$^2$) | 35 | 48 | 29 | 45 |
| Young's modulus of 2nd clad (kg/mm$^2$) | 17 | 65 | 45 | 17 |
| Linear expansion coefficient of 1st clad ($\times 10^{-4}$) | 1.4 | 0.9 | 1.5 | 1.4 |
| Linear expansion coefficient of 2nd clad ($\times 10^{-4}$) | 1.8 | 1.8 | 2.0 | 1.8 |
| Resin of stress buffer layer | UV-curable urethane acrylate resin | UV-curable urethane acrylate resin | UV-curable urethane acrylate resin | UV-curable urethane acrylate resin |
| Outer diameter of stress buffer layer ($\mu$m) | 400 | 400 | 400 | 308 |
| Hardness of stress buffer layer | A50 | A50 | A50 | A50 |
| 90°-peeling force of stress buffer layer (g/cm) | 25 | 25 | 25 | 25 |
| ($D_S - D_{CL}$)/($D_B - D_{CL}$) | 0.63 | 0.63 | 0.63 | 0.29 |
| Transmission loss (dB/km) (wavelength: 850 nm) | 5.2 | 5.6 | 5.0 | 5.1 |
| Transmission loss (dB/km) (wavelength: 650 nm) | 7.1 | 7.8 | 6.9 | 7.0 |
| Transmission speed (Mbps) | 163 (150 m) | 187 (200 m) | 169 (200 m) | 175 (150 m) |
| Bending loss (dB) | 0.17 | 0.38 | 0.27 | 0.19 |
| Caulking loss (dB) | 0.48 | 0.53 | 0.49 | 0.52 |
| Low-temperature characteristic (dB) | 0.99 | 1.30 | 1.25 | 2.11 |
| Cracking of clads | No | Yes | No | Yes |
| Peeling of clads | No | Yes | No | Yes |
| Mirror-finishing ratio of cut surface (%) | 68 | 80 | 69 | 79 |

Examples 10 and 11

In Example 10, produced was an optical fiber in the same manner as in Example 1 except that the following composition D was used as the polymer precursor composition for the second clad.

In Example 11, produced was an optical fiber in the same manner as in Example 3 except that the following composition E was used as the polymer precursor composition for the first clad.

These optical fibers were measured and evaluated in the same manner as in Example 1, and their data are shown in Table 4 while being compared with the data of the optical fibers of Examples 1 and 3.

| Composition D: | |
|---|---|
| 1,1,1-Trihydroperfluoroundecyl acrylate | 45.5 wt. pts. |
| 2,2,3,3-Tetrafluoropropyl acrylate | 7.0 wt. pts. |
| Trimethylolpropane triacrylate | 17.5 wt. pts. |
| Polymer produced by polymerizing the above-mentioned acrylates (molecular weight: 800 to 1000) | 30 wt. pts. |
| Photopolymerization initiator (same as above) | 0.50 wt. pts. |

Photopolymerization initiator (same as above) 0.50 wt. pts.

| Composition E: | |
|---|---|
| 2-(Perfluorooctyl)ethyl acrylate | 34 wt. pts. |
| 2,2,3,3-Tetrafluoropropyl acrylate | 22 wt. pts. |
| Trimethylolpropane triacrylate | 14 wt. pts. |
| Polymer produced by polymerizing the above-mentioned acrylates (molecular weight: 800 to 1000) | 30 wt. pts. |
| Photopolymerization initiator (same as above) | 0.48 wt. pts. |

The optical fibers obtained herein were good with respect to their transmission characteristics in that the bending loss and the caulking loss in them were small. However, their transmission characteristics often significantly fluctuated, and the clads of some of them often cracked and peeled.

TABLE 4

| | Example 1 | Example 10 (compared with claim 11) | Example 3 | Example 11 (compared with claim 11) |
|---|---|---|---|---|
| Polymer precursor composition for 1st clad | Composition A | Composition A | Composition C | Composition E |
| Refractive index of 1st clad ($n_{CL1}$) | 1.440 | 1.440 | 1.420 | 1.420 |
| Polymer precursor composition for 2nd clad | Composition B | Composition D | Composition B | Composition B |
| Refractive index of 2nd clad ($n_{CL2}$) | 1.409 | 1.409 | 1.409 | 1.409 |
| Transmission loss (dB/km) (wavelength: 850 nm) | 5.6 | 5.8 | 5.2 | 5.9 |
| Transmission loss (dB/km) (wavelength: 650 nm) | 7.9 | 8.1 | 7.1 | 7.8 |
| Transmission speed (Mbps) | 192 (200 m) | 180 (200 m) | 192 (100 m) | 187 (100 m) |
| Bending loss (dB) | 0.28 ± 0.03 | 0.28 ± 0.15 | 0.17 ± 0.02 | 0.18 ± 0.16 |
| Caulking loss (dB) | 0.42 ± 0.03 | 0.42 ± 0.17 | 0.33 ± 0.02 | 0.34 ± 0.12 |
| Cracking of clads | No | Yes | No | Yes |
| Peeling of clads | No | Yes | No | Yes |

TABLE 4-continued

| | Example 1 | Example 10 (compared with claim 11) | Example 3 | Example 11 (compared with claim 11) |
|---|---|---|---|---|
| Mirror-finishing ratio of cut surface (%) | 99 | 92 | 97 | 87 |

Industrial Applicability

The invention realizes wide-band PCF which show a high transmission speed of 156 Mbps or higher for 100 to 200 m and are suitable to wide-band information transmission systems, ATM-LAN and high-speed Ethernet. In addition, since the bending loss and the caulking loss in them are small, the PCF of the invention are easy to handle, work and connect with connectors, and have good characteristics for many practical applications.

Further, the PCF of the invention have good transmission characteristics at low temperatures, and are cracked or peeled little at their cut surfaces. They can be cut with ease to have mirror-finished cut surfaces.

What is claimed is:

1. A wide-band plastic-clad optical fiber comprising a quartz core and a polymer clad tightly formed around the core, which is characterized in that the clad has a multi-layered structure of a plurality of different polymers formed from polymer precursor compositions consisting essentially of monomers of fluoroalkyl containing (meth)acrylates and monofunctional or poly functional comonomers of alkyl-containing (meth)acrylates, and the refractive index of the core ($n_{CO}$), that of the first clad ($n_{CL1}$) as tightly formed around the core and that of the second clad ($n_{CL2}$) as tightly formed over the first clad satisfy both $0.21 \leq \sqrt{(n_{CO}^2 - n_{CL1}^2)} \leq 0.35$ and $n_{CL2} < n_{CL1}$, wherein both the first and second clads are of UV-cured resins having a Shore hardness of not less than D60.

2. The wide-band plastic-clad optical fiber as claimed in claim 1, wherein the UV-cured resins are UV-cured fluorine-containing (meth)acrylate resins.

3. The wide-band plastic-clad optical fiber as claimed in claim 1, wherein said UV-cured resins have a linear expansion coefficient at room temperature of from $1.0 \times 10^{-4}$ to $2.3 \times 10^{-4}$.

4. The wide-band plastic-clad optical fiber as claimed in claim 1, wherein the first clad is of a UV-cured resin having a Young's modulus at 23° C. of from 30 to 65 kg/mm², and the second clad is of a UV-cured resin having a Young's modulus at 23° C. of from 15 to 60 kg/mm².

5. The wide-band plastic-clad optical fiber as claimed in claim 1, wherein the thickness (D1) of the first clad and that (D2) of the second clad are both not less than 5 μm.

6. The wide-band plastic-clad optical fiber as claimed in claim 1, wherein the refractive indices of the core, the first clad and the second clad ($n_{CO}$, $n_{CL1}$ and $n_{CL2}$) satisfy $\sqrt{(n_{CO}^2 - n_{CL2}^2)} \geq [\sqrt{(n_{CO}^2 - n_{CL1}^2)} + 0.03]$.

7. The wide-band plastic-clad optical fiber as claimed in claim 1, wherein the first clad and/or the second clad are/is layer(s) as formed by coating a UV-curable composition substantially not containing a high-molecular product formed by polymerization, followed by curing the composition with UV rays.

8. The wide-band plastic-clad optical fiber as claimed in claim 7, of which the clads are formed by applying a UV-curable composition for the first clad over said core, curing it with UV rays to a curing degree of from 50 to 90%, then applying a UV-curable composition for the second clad over the thus-formed first clad, and finally curing it with UV rays.

9. A wide-band plastic-clad optical fiber comprising a quartz core and a polymer clad tightly formed around the core, which is characterized in that the clad has a multi-layered structure of a plurality of different polymers formed from polymer precursor compositions consisting essentially of monomers of fluoroaklyl containing (meth)acrylates and monofunctional or poly functional comonomers of alkyl-containing (meth)acrylates, and the refractive index of the core ($n_{CO}$), that of the first clad ($n_{CL1}$) as tightly formed around the core and that of the second clad ($n_{CL2}$) as tightly formed over the first clad satisfy both $0.21 \leq \sqrt{(n_{CO}^2 - n_{CL1}^2)} < 0.30$ and $n_{CL2} < n_{CL1}$, and that both the first and second clads are of UV-cured resins having a Shore hardness of not less than D60.

10. The wide-band plastic-clad optical fiber as claimed in claim 9, which has a stress buffer layer of an energy-cured polymer as formed tightly around the multi-layered clad, and a barrier layer as formed over said stress buffer layer.

11. The wide-band plastic-clad optical fiber as claimed in claim 10, wherein the outer diameter of the second clad (DCL2), the outer diameter of the stress buffer layer (DS) and the outer diameter of the barrier layer (DB) satisfy $0.3 \leq (DS-DCL2)/(DB-DCL2) \leq 0.7$.

12. A wide-band plastic-clad optical fiber comprising a quartz core and a polymer clad tightly formed around the core, which is characterized in that the clad has a multi-layered structure of a plurality of different polymers, and the refractive index of the core ($n_{CO}$), that of the first clad ($n_{CL1}$) as tightly formed around the core and that of the second clad ($n_{CL2}$) as tightly formed over the first clad satisfy both $0.21 \leq \sqrt{(n_{CO}^2 - n_{CL1}^2)} \leq 0.35$ and $n_{CL2} < n_{CL1}$, and wherein the total of the thickness (D1) of the first clad and that (D2) of the second clad, (D1+D2) is not more than 20 µm, and wherein both said first clad and said second clad are of UV-cured resins having a Shore hardness of not less than D60.

13. A wide-band plastic-clad optical fiber comprising a quartz core and a polymer clad tightly formed around the core, which is characterized in that the clad has a multi-layered structure of a plurality of different polymers formed from polymer precursor compositions consisting essentially of monomers of fluoroalkyl containing (meth)acrylates and monofunctional or poly functional comonomers of alkyl-containing (meth)acrylates, and the refractive index of the core ($n_{CO}$), that of the first clad ($n_{CL1}$) as tightly formed around the core and that of the second clad ($n_{CL2}$) as tightly formed over the first clad satisfy both $0.21 \leq \sqrt{(n_{CO}^2 - n_{CL1}^2)} \leq 0.35$ and $n_{CL2} < n_{CL1}$, wherein the clads are formed by applying a UV-curable composition for the first clad over said core, curing it with UV rays to a curing degree of from 50 to 90%, applying a UV-curable composition for the second clad over the thus-formed first clad and curing it with UV rays and that both the first and second clads are of UV-cured resins having a Shore hardness of not less than D60.

14. A wide-band plastic-clad optical fiber comprising a quartz core and a polymer clad as tightly formed around the core, which is characterized in that the clad has a multi-layered structure of a plurality of different polymers and has a stress buffer layer of an energy-cured polymer as formed tightly around the multi-layered clad, and a barrier layer as formed over said stress buffer layer, and the refractive index of the core ($n_{CO}$), that of the first clad as tightly formed around the core ($n_{CL1}$) and that of the second clad as tightly formed over the first clad ($n_{CL2}$) satisfy both $0.21 \leq \sqrt{(n_{CO}^2 - n_{CL1}^2)} \leq 0.30$ and $n_{CL2} < n_{CL1}$, wherein said stress buffer layer is of a UV-cured resin having a 90°-peeling force of not more than 45 g/cm, and wherein both the first clad and the second clad are of UV-cured resins having a Shore hardness of not less than D60.

\* \* \* \* \*